US006042914A

United States Patent [19]

Lubar

[11] Patent Number: 6,042,914

[45] Date of Patent: Mar. 28, 2000

[54] TRANSFERABLE MEDIUM FOR INKJET PRINTING

[75] Inventor: Michael J. Lubar, Endwell, N.Y.

[73] Assignee: Azon Corporation, Johnson City, N.Y.

[21] Appl. No.: 08/151,454

[22] Filed: Nov. 15, 1993

[51] Int. Cl.[7] ........................ B32B 27/08; B32B 27/18; B32B 27/30; B32B 27/42

[52] U.S. Cl. ........................ 428/41.4; 428/40.1; 428/41.7; 428/41.8; 428/42.1; 428/195; 428/202; 428/203; 428/421; 428/447; 428/448; 428/451; 428/500; 428/515; 428/519; 428/914

[58] Field of Search ........................ 428/480, 483, 428/515, 516, 446, 447, 451, 452, 323, 331, 343, 352, 354, 914, 40, 42, 202, 203, 40.1, 41.4, 42.1, 41.7, 41.8, 195, 421, 448, 500, 519

[56] References Cited

U.S. PATENT DOCUMENTS

| | | | |
|---|---|---|---|
| 4,074,000 | 2/1978 | Hankee et al. | 428/323 |
| 4,179,397 | 12/1979 | Rohowetz et al. | 252/408 |
| 4,318,953 | 3/1982 | Smith et al. | 428/200 |
| 4,391,853 | 7/1983 | Pointon | 427/152 |
| 4,775,594 | 10/1988 | Desjarlais | 428/421 |
| 4,842,950 | 6/1989 | Barton | 428/483 |
| 5,032,449 | 7/1991 | af Strom | 428/195 |
| 5,108,503 | 4/1992 | Hindagolla et al. | 106/22 |
| 5,132,146 | 7/1992 | Maruyama et al. | 427/261 |

*Primary Examiner*—Vivian Chen
*Attorney, Agent, or Firm*—Gifford, Krass, Groh, Sprinkle, Anderson & Citkowski, P.C.

[57] ABSTRACT

The present invention features a method of applying images and text to surfaces that ordinarily cannot fit within an inkjet printing machine, such as license plate blanks. The method of the invention uses a specially designed transfer sheet to receive inkjet ink images and text. The carrier layer of the transfer sheet containing the inkjet image and text is removed or otherwise peeled from the transfer sheet backing and then adhered to the license plate blank. A computer is used to construct the inkjet image and text that are printed onto the carrier surface of the transfer sheet. A final resin/ pigment layer is coated upon the upper surface of the carrier layer in order to receive the inkjet ink that has been fashioned into image and text by means of the computer.

23 Claims, 1 Drawing Sheet

TRANSFERABLE MEDIUM FOR INKJET PRINTING

FIELD OF THE INVENTION

The present invention pertains to the printing of graphic and textual information onto surfaces that ordinarily cannot be accommodated by inkjet printers and, more particularly, to the inkjet printing of license plate blanks by means of a paper transfer technique.

BACKGROUND OF THE INVENTION

The present invention entails the transfer of inkjet printing images and/or textual information onto license plate substrates. Such license plate blanks cannot be fed into an inkjet printer, due to their stiffness, size, thickness and irregular surfaces containing embossed characters and peripheral ridges.

Only certain label materials can accept inkjet inks. Having pressure-sensitive backings, the labels are pasted onto objects. Some labels are sufficiently transparent so that the background"fades", leaving only the image visible. Such materials, however, are not acceptable for a "graphic" application and, thus, would not serve as a means to provide a license plate substrate with graphics and text. Additionally, a license plate window area is too large and the labels utilizing inkjet printing too small to satisfactorily jibe for a successful print job.

Images produced by means of inkjet printers may be transferred to other substrates by utilizing transfer or carrier sheets. Inkjet receptive layers (single or multiple) are coated onto a carrier sheet. The carrier sheet is first coated with a silicone release system, so that the inkjet layer(s) may be easily removed by pressure-sensitive adhesive or by heat and pressure. The inkjet layer(s) are sufficiently cohesive enough to be manually placed onto another substrate such as a license plate blank.

In the present invention an image produced by a computer is printed by an inkjet printer or an inkjet plotter. A treated transfer sheet material that will accept the image is placed in the media compartment of the printer or plotter. Once the printing is complete, the image disposed upon the carrier layer is easily removed from the backing of the transfer sheet material. The carrier sheet, bearing the graphics and text, is then adhered to a license plate blank.

The production of a transferable medium that will accommodate inkjet printing requires several elaborate steps, hereinafter enumerated:

1. On a dense, solvent hold-out paper, a coating of commercial silicone release is applied.

2. The solvent is removed from the paper, and the paper layer is then cured.

3. A carrier layer is coated onto the silicone release layer. This carrier layer is designed by this invention to have a greater cohesion than the adhesion to the silicone layer. A second characteristic of the carrier sheet is its ability to resist penetration of the inkjet ink. This ink resistance is necessary, so that the ink will not coat the silicone surface. The carrier must adhere to the silicone to allow for transport and manipulation which would otherwise be impaired by the penetrating ink. The carrier layer, however, must also be designed so that it is removable from the silicone layer (by peeling, for example).

4. A final coating is layered upon the upper surface of the carrier in order to receive the inkjet image. This layer is composed of resins/pigments to absorb and enhance the ink characteristics. This coating layer is designed by this invention to adhere well to the carrier layer.

SUMMARY OF THE INVENTION

In accordance with the present invention, there is provided a method of applying images and text to surfaces that ordinarily cannot be accommodated by an inkjet printing machine, such as license plate blanks. The method of the invention uses a specially designed transfer sheet to receive inkjet ink images and text. The carrier layer of the transfer sheet containing the inkjet image and text is removed or otherwise peeled from the transfer sheet backing and then adhered to the license plate blank. A computer is used to construct the inkjet image and text that are printed onto the carrier surface of the transfer sheet. A final resin/pigment layer is coated upon the upper surface of the carrier layer in order to receive the inkjet ink that has been fashioned into image and text by means of the computer.

The transfer sheet of this invention is fabricated by first coating a dense, solvent hold out-paper with a silicone release substance. After the solvent is removed therefrom, the paper is cured. To the silicone release layer is then applied a carrier layer that has a greater cohesion than adhesion used for the silicone release surface of the hold-out paper. Over the carrier layer is applied an ink absorption layer that is composed of resins and pigments to absorb and enhance the ink characteristics. This final layer is designed by this invention to adhere well to the carrier layer.

BRIEF DESCRIPTION OF THE DRAWINGS

A complete understanding of the present invention may be obtained by reference to the accompanying drawings, when considered in conjunction with the subsequent detailed description, in which.

DESCRIPTION OF THE PREFERRED EMBODIMENT

Generally speaking, the present invention comprises a method whereby an image produced by a computer is printed by an inkjet printer or an inkjet plotter upon a transfer medium. The medium is then placed in the appropriate compartment of the printer or plotter. The transfer medium accepts the image and text being printed thereon. Once printing is complete, the image disposed upon the transfer sheet's carrier layer is transferred to a license plate blank by removing the carrier from the backing of the transfer sheet material and adhering it then to a license plate blank.

The manufacture of the transfer sheet of this invention is explained with reference to FIGS. 1 through 3 and the following EXAMPLES.

Figure 1:
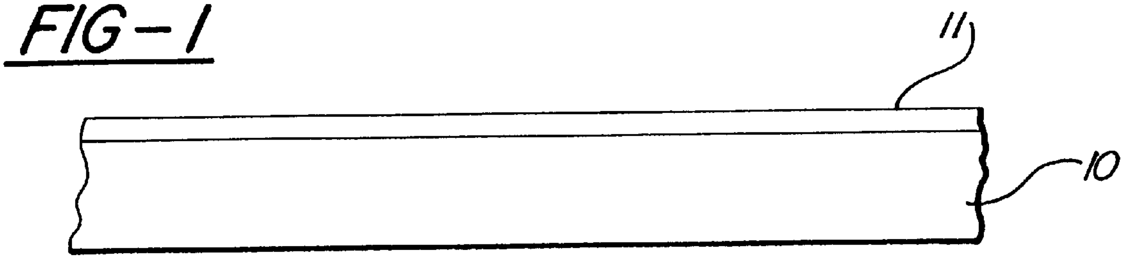
FIG. 1 is a schematic view of a solvent hold-out paper, upon which a silicone coating is applied.

Now referring to FIG. 1, a solvent hold-out paper (substrate layer) 10 is shown, upon which a silicone coating 11 is applied. The solvent is then removed, usually by heating and curing the paper 10.

Figure 2:
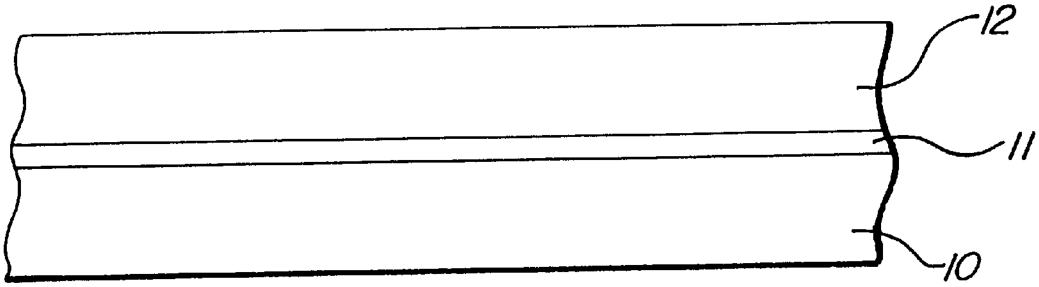
FIG. 2 is a schematic view of a carrier layer coating being applied to the hold-out paper depicted in FIG. 1.

Referring to FIG. 2, a carrier layer coating 12 is then applied over the silicone coating layer 11 of the hold-out paper 10. This carrier layer 12 is designed by this invention to have a greater cohesion than adhesion to the silicone layer 11. A second design criterion of the carrier sheet 12 is its ability to resist penetration of inkjet ink that is later applied. This ink resistance is necessary, so that the inkjet ink will not coat the silicone surface. The carrier must adhere to the silicone layer 11 to allow for transport and manipulation which would otherwise be impaired by the penetrating ink. The carrier layer 12, however, must also be designed so that it is removable from the silicone layer 11 (by peeling, for example).

Figure 3:
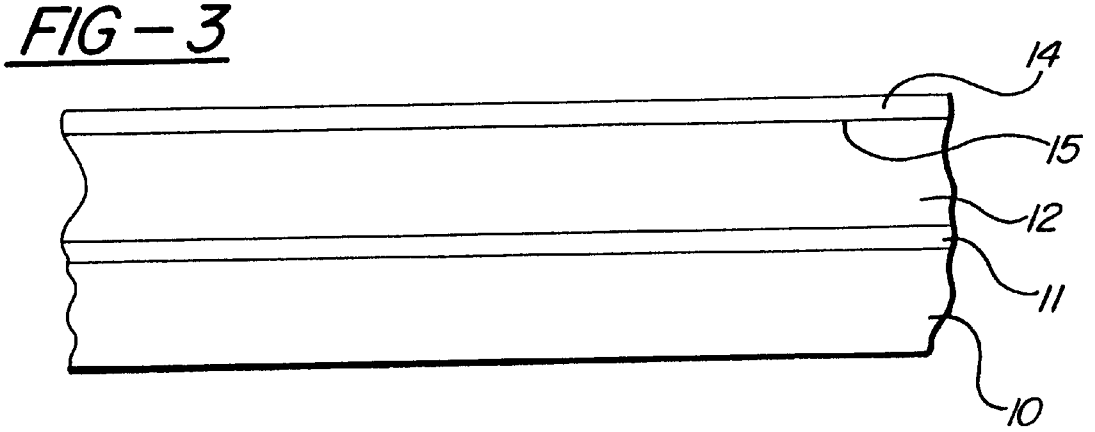
FIG. 3 is a schematic view of a final coating being applied to the carrier layer of FIG. 2. This final coating is for adapting the carrier layer to receive the inkjet ink.

Referring to FIG. 3, a final coating 14 is layered upon the upper surface 15 of the carrier layer 12 in order to receive the inkjet image. This layer 14 is composed of resins/pigments to absorb and enhance the ink characteristics. This coating layer 14 is designed by this invention to adhere well to the carrier layer 12.

The transfer sheet is fabricated according to the following EXAMPLES:

EXAMPLE 1

Onto a commercially coated silicone-release paper 10, the following carrier layer 12 composition is coated:

| | | |
|---|---|---|
| Pigment paste | @ 40% silica | 104 lbs. |
| | @ 18% resin | |
| | @ 42% solvent | |
| Urea formaldehyde resin 100% | | 9.25 lbs. |
| Carboxylated acrylic resin 40% | | 126 lbs. |
| p-TSA catalyst sufficient for drying conditions | | |
| Fluorinated surfactant FC 431 | | 0.6 lbs. |
| Ethyl acetate | | 90.0 lbs. |
| Methyl Ethyl Ketone | | 48.0 lbs. |

This coating is applied by any conventional means at a coat weight of about 20–259/ml, wet. This layer has sufficient adhesion to the base so that typical manipulation will not cause delamination or cracking. If an adhesion test with moderately tacky tape is performed, however, the layer will come off easily with the tape.

Common inkjet ink is not compatible with the carrier layer 12, so another ink absorption surface layer 14 that will accept the ink must be provided. The composition of layer 14 is:

| | |
|---|---|
| Methanol | 111 lbs. |
| Isopropanol | 39 lbs. |
| Cationically modified film forming Acrylic resin | 119 lbs. |
| Formic acid | 11 lbs. |
| Syloid 72 (Silica) | 40 lbs. |

This coating 14 is applied to the carrier layer 12 by conventional means at a dry coat weight of about 8 lbs./3000 square feet.

This medium can be placed in a Hewlett-Packard Paintjet inkjet printer and an image produced in reverse reading mode. The printing surface becomes tacky after a few moments, since paintjet inks contain a considerable amount of glycol. The tack is sufficient to allow the entire layer 12 to be removed from the backing sheet 10 when the sheet is pressed firmly onto another surface in order to transfer the image and text thereto.

EXAMPLE 2

Onto the same silicone release liner 10 as in EXAMPLE 1, the following clear lacquer composition is coated:

| | |
|---|---|
| Methanol | 40 lbs. |
| Dowanol PM | 110 lbs. |
| Calgon 7091 (cationic polymer) | 15 lbs. |
| MEK | 135 lbs. |
| Cellulose Acetate Propionate | 25 lbs. |
| Uformite F-200 E | 10 lbs. |
| p-TSA | 340 gms. |
| Fluorad FC 431 | 0.6 lbs. |

The same ink-receptive layer 14 as employed in EXAMPLE 1 is coated onto this carrier layer. When transfer is complete, the image is glossy.

EXAMPLE 3

In the previous EXAMPLES the carrier was inert to the inkjet ink. This is an example of the carrier being part of the ink-absorption process.

A lacquer is prepared in the following manner:

| | |
|---|---|
| Methanol | 75 lbs. |
| Polyvinyl Pyrollidone K-90 | 6.4 lbs. |
| Acrylic resin solution SP-7 30% | 8.6 lbs. |
| Ethyl Acetate | 25 lbs. |

When coated at a coat weight of about 3 lbs./3000 sq. ft., this layer produces a layer that will absorb significant amounts of ink. To prevent this layer from becoming greasy, a second layer is used. The second layer allows the ink solvents to penetrate and be trapped while maintaining a dry feel. The second layer composition is as follows:

| | |
|---|---|
| Water | 94 lbs. |
| Polyvinyl Alcohol | 5 lbs. |
| Pigments, additives, cross-linkers, etc. | 1 lb. |

Since no tack develops in this case, an external adhesive must be used to achieve transfer.

EXAMPLE 4

This EXAMPLE does not employ a carrier layer at all; instead, it uses the inkjet lacquer described in EXAMPLE 1. The lacquer is coated to a coat weight of about 13 lbs./3000 sq. ft. This amount is significantly higher than in the first EXAMPLE. When printed with glycol and anionic ink ingredients, the layer becomes tacky. The image is washed in a stream of warm water. The unprinted background is flushed away, and a relief image remains. Such a method is very useful in an instance where any background at all might mar the appearance of a transferred product.

EXAMPLE 5

Onto a commercially coated silicone-release paper 10, the following carrier layer 12 is coated:

| | |
|---|---|
| micro crystaline silica[1] | 42 lbs. |
| thermoplastic acrylic resin[2] | 19 lbs. |
| propylene glycol mono methyl ether[3] | 42 lbs. |
| urea formaldehyde resin[4] | 10 lbs. |

-continued

| | |
|---|---|
| carboxylated acrylic resin[5] | 126 lbs. |
| p-toluene sulfonic acid | 250 gm. |
| nonionic flourinated alkyl ester[6] | 272 gm. |
| methyl ethyl ketone | 75 lbs. |
| ethyl acetate | 25 lbs. |

From:
[1]Imsil A-10 Illinois Minerals, Cairo, IL
[2]Acryloid B-99 Rohm & Haas, Phila, PA
[3]Dowanol PM Dow Chemical, Midland, MI
[4]Beckamine 21-500 Richold Chemicals, Elizabeth, NJ
[5]Surcol SP-2 Allied Colloids, Suffolk, VA
[6]3M Fluorad FC431 3M Co., St. Paul, MN The common inkjet layer is comprised of:

| | |
|---|---|
| methanol | 111 lbs. |
| isopropanol | 39 lbs. |
| cationically modified film forming acrylic resin[1] | 119 lbs. |
| formic acid | 11 lbs. |
| precipitated silica[2] | 40 lbs. |

From:
[1]Surcol SP-6 Allied Colloids, Suffolk, VA
[2]Syloid 72 Grace Chemical Co., Baltimore, MD

EXAMPLE 6

A lacquer is prepared in the following manner:

| | |
|---|---|
| methanol | 75 lbs. |
| polyvinylpyrollidone (high mol wt)[1] | 6.4 lbs. |
| carboxylated, hydroxylated acrylic resin soln. 30% in ethyl acetate[2] | 8.6 lbs. |

From:
[1]PVP K-90 IPS Co., Wayne, NJ
[2]Surcol SP-7 Allied Colloids, Suffolk,VA

The second layer is comprised as follows:

| | |
|---|---|
| water | 94 lbs. |
| Polyvinylalcohol[1] | 5 lbs. |
| precipitated silica[2] | 0.5 lbs. |
| glyoxal 40% | 0.2 lbs. |
| fluorinated alkyl ester[3] | 0.01 lbs. |

From:
[1]Polyvinyl alcohol Nipon Gohsei, Osaka, Japan
[2]Syloid 72 Grace Chemical Co., Baltimore, MD
[3]Fluorad FC430 3M Co., St Paul, MN

Inkjet Inks

Inkjet inks as defined by HP and Canon patents contain:

1. Cationic or anionic dyes in water or diethylene glycol and water
2. The amount of glycol is between 30 and 60 wt %
3. Inkjet inks may contain a water-soluble resin
4. Multivalent ions are often added as precipitation agents for drying
5. Polyether polyols are added as surface tension modifiers
6. Buffers, humectants and bactericide are also used to prevent clogging The relevant patents for HP and Canon ink include the following U.S. Pat. Nos.:

| | |
|---|---|
| HP: | 5198023 |
| | 5188664 |
| | 5143547 |
| | 5183502 |
| | 5169437 |
| | 5165968 |
| Canon: | 5172133 |
| | 5167703 |

For those skilled in the art, it is clear that many variations in the composition of the various layers are possible. For example, the carrier may be matte, clear, or contain nacreous pigments for decorative effects. The carrier may be inert to inkjet ink or play a part in ink-drying through absorption.

For EXAMPLE 5, the following ingredients can be formulated in the approximate ranges of:

| | |
|---|---|
| micro crystaline silica[1] | 40 to 60 lbs. |
| thermoplastic acrylic resin[2] | 15 to 25 lbs. |
| propylene glycol mono methyl ether[3] | 42 lbs. |
| urea formaldehyde resin[4] | 8 to 20 lbs. |
| carboxylated acrylic resin[5] | 100 to 140 lbs. |
| p-toluene sulfonic acid | 200 to 450 gm. |
| nonionic fluorinated alkyl ester[6] | 139 to 386 gm. |
| methyl ethyl ketone | 75 lbs. |
| ethyl acetate | 25 lbs. |

The common inkjet ink receiving layer can also be formulated in the approximate ranges of:

| | |
|---|---|
| methanol | 111 lbs. |
| isopropanol | 39 lbs. |
| cationically modified film forming acrylic resin[1] | 72 to 180 lbs. |
| formic acid | 11 lbs. |
| precipitated silica[2] | 25 to 60 lbs. |

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A transfer sheet for transferring inkjet ink images and text to substrates that will not generally fit within inkjet printing machinery, said transfer sheet comprising:

a substrate layer;

a polymer release layer disposed over said substrate layer;

a carrier layer disposed over said polymer release layer and having greater cohesion than adhesion to said polymer release layer, said carrier layer being removable from said release and substrate layers and generally being ink-impermeable; and an ink receiving layer disposed over said carrier layer for receiving inkjet inks, said ink receiving layer being adhered to said carrier layer.

2. The transfer sheet for transferring inkjet ink images and text to substrates in accordance with claim 1, wherein said ink receiving layer comprises pigments and resins for absorbing and enhancing ink characteristics of said inkjet ink.

3. The transfer sheet for transferring inkjet ink images and text to substrates in accordance with claim 2, wherein said ink receiving layer comprises a water-soluble resin.

4. The transfer sheet for transferring inkjet ink images and text to substrates in accordance with claim 1, wherein said ink receiving layer can receive inkjet ink comprising cationic dyes.

5. The transfer sheet for transferring inkjet ink images and text to substrates in accordance with claim 1, wherein said ink receiving layer can receive inkjet ink comprising anionic dyes.

6. The transfer sheet for transferring inkjet ink images and text to substrates in accordance with claim 1, wherein said ink receiving layer can receive inkjet ink comprising diethylene glycol.

7. The transfer sheet for transferring inkjet ink images and text to substrates in accordance with claim 1, wherein said ink receiving layer contains at least one material selected from a group of materials consisting of methanol, isopropanol, acrylic resin, formic acid and precipitated silica.

8. The transfer sheet for transferring inkjet ink images and text to substrates in accordance with claim 7, wherein said ink receiving layer contains said group of materials in approximate weight ranges of:

| | |
|---|---|
| methanol | 111 lbs. |
| isopropanol | 39 lbs. |
| acrylic resin | 72 to 180 lbs. |
| formic acid | 11 lbs. |
| precipitated silica | 25 to 60 lbs. |

9. The transfer sheet for transferring inkjet ink images and text to substrates in accordance with claim 1, wherein said carrier layer contains at least one material of a group of materials consisting of: micro crystaline silica, thermoplastic acrylic resin, propylene glycol mono methyl ether, urea formaldehyde resin, carboxylated acrylic resin, p-toluene sulfonic acid, nonionic fluorinated alkyl ester, methyl ethyl ketone and ethyl acetate.

10. The transfer sheet for transferring inkjet ink images and text to substrates in accordance with claim 9, wherein said carrier layer contains said group of materials in approximate weight ranges of: micro crystaline silica, 40 to 60 lbs; thermoplastic acrylic resin, 15 to 25 lbs; propylene glycol mono methyl ether, 42 lbs; urea formaldehyde resin, 8 to 20 lbs; carboxylated acrylic resin, 100 to 140 lbs; p-toluene sulfonic acid, 200 to 450 gm; nonionic fluorinated alkyl ester, 139 to 386 gm; methyl ethyl ketone, 75 lbs; and ethyl acetate, 25 lbs.

11. The transfer sheet for transferring inkjet ink images and text to substrates in accordance with claim 1, wherein said carrier layer is removed from said substrate and utilized in combination with a license plate base plate.

12. A transfer sheet for transferring inkjet ink images and text to substrates that will not generally fit within inkjet printing machinery, said transfer sheet comprising:

a substrate layer;

a silicone release layer disposed over said substrate layer;

at least one clear lacquer layer disposed over said silicone release layer and being generally ink-impermeable; and an inkjet ink receiving layer disposed over and adhering to said clear lacquer layer.

13. The transfer sheet for transferring inkjet ink images and text to substrates in accordance with claim 12, wherein there are two clear lacquer layers.

14. The transfer sheet for transferring inkjet ink images and text to substrates in accordance with claim 13, wherein a first lacquer layer comprises at least one material selected from a group of materials consisting of: methanol, polyvinylpyrollidone, acrylic resin, ethyl acetate water, polyvinyl alcohol, precipitated silica, glyoxal and a fluorinated alkyl ester; and a second lacquer layer comprises at least one material selected from a group of materials consisting of: water, polyvinyl alcohol, precipitated silica, glyoxal and a fluorinated alkyl ester.

15. The transfer sheet for transferring inkjet ink images and text to substrates in accordance with claim 12, wherein said at least one clear lacquer layer comprises at least one material selected from a group of materials consisting of methanol, polyvinylpyrollidone, acrylic resin and ethyl acetate.

16. The transfer sheet for transferring inkjet ink images and text to substrates in accordance with claim 12, wherein said at least one clear lacquer layer comprises at least one material selected from a group of materials consisting of water, polyvinyl alcohol, precipitated silica, glyoxal and a fluorinated alkyl ester.

17. A transfer sheet for transferring inkjet ink images and text to substrates, said transfer sheet comprising:

a substrate layer;

a silicone release layer disposed over said substrate layer;

a carrier layer disposed over said silicone release layer, said carrier layer being removable from said silicone and substrate layers generally by peeling it therefrom, said carrier layer being generally ink-impermeable; and an ink receiving layer disposed over and adhered to said carrier layer for receiving inkjet inks.

18. The transfer sheet for transferring inkjet ink images and text to substrates in accordance with claim 17, wherein said ink receiving layer comprises pigments and resins for absorbing and enhancing ink characteristics of said inkjet ink.

19. The transfer sheet for transferring inkjet ink images and text to substrates in accordance with claim 18, wherein said ink receiving layer comprises a water-soluble resin.

20. The transfer sheet for transferring inkjet ink images and text to substrates in accordance with claim 17, wherein said ink receiving layer can receive inkjet ink comprising cationic dyes.

21. The transfer sheet for transferring inkjet ink images and text to substrates in accordance with claim 17, wherein said ink receiving layer can receive inkjet ink comprising anionic dyes.

22. The transfer sheet for transferring inkjet ink images and text to substrates in accordance with claim 17, wherein said ink receiving layer can receive inkjet ink comprising diethylene glycol.

23. The transfer sheet for transferring inkjet ink images and text to substrates in accordance with claim 17, wherein said carrier layer is removed from said substrate and utilized in combination with a license plate base plate.

* * * * *